May 4, 1926.

M. DICKERSON

FUR SHEARING MACHINE

Filed June 5, 1925

WITNESSES

INVENTOR
Malcolm Dickerson,
BY
ATTORNEYS

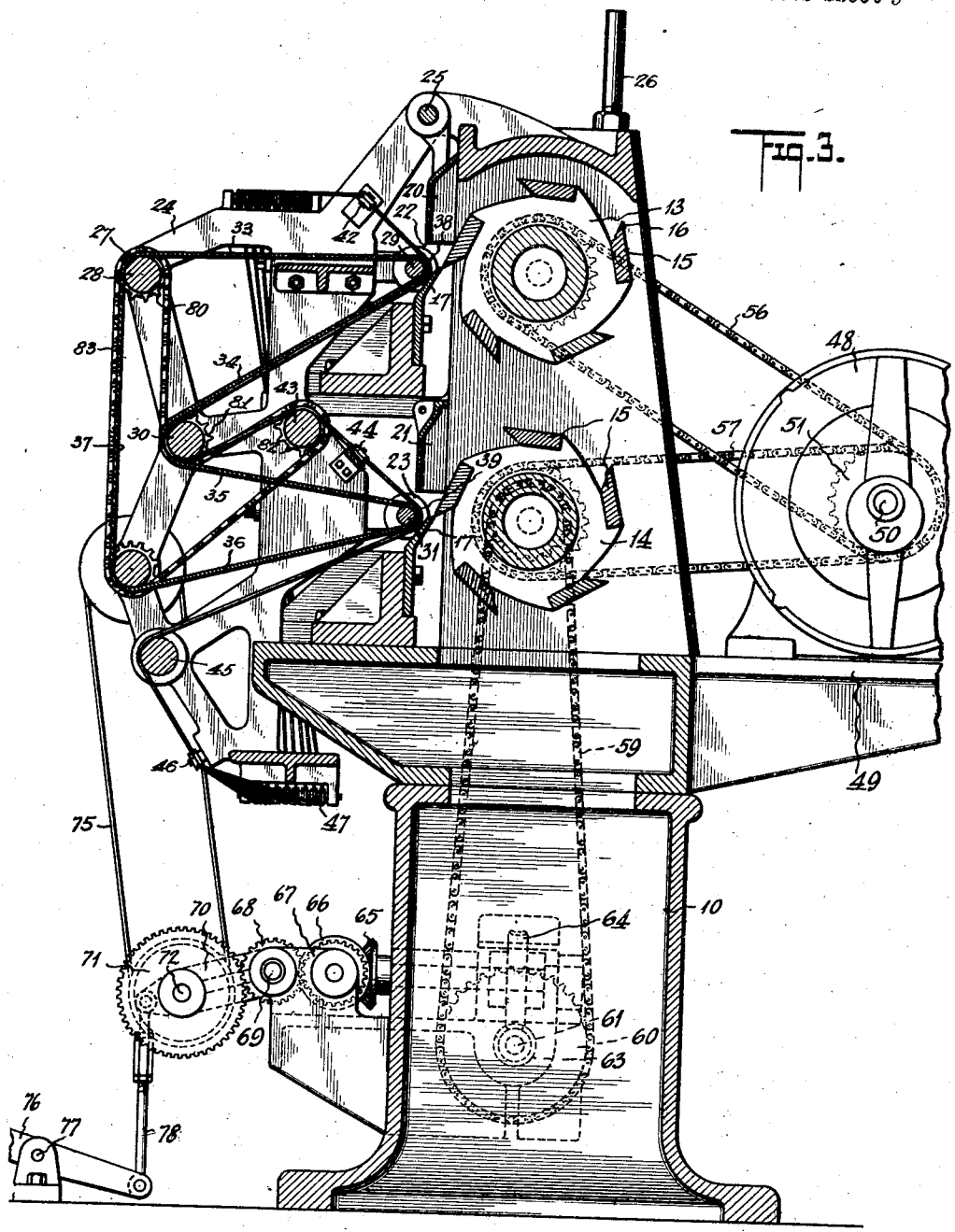

May 4, 1926.
M. DICKERSON
1,583,675
FUR SHEARING MACHINE
Filed June 5, 1925
4 Sheets-Sheet 4
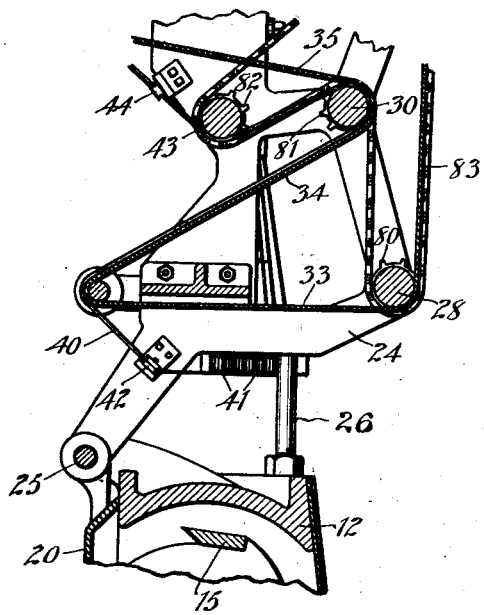
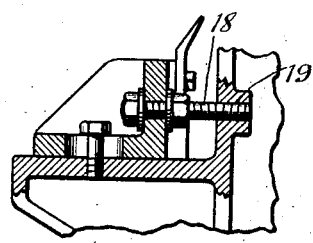
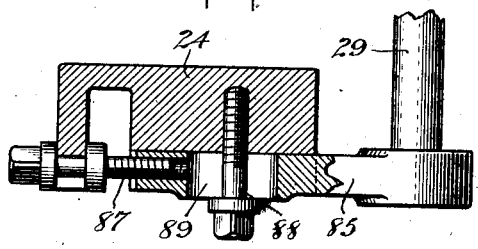
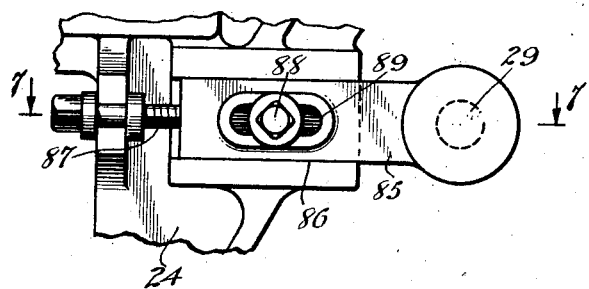
WITNESSES
INVENTOR
Malcolm Dickerson,
BY
ATTORNEYS Patented May 4, 1926.

1,583,675

UNITED STATES PATENT OFFICE.

MALCOLM DICKERSON, OF NEWARK, NEW JERSEY, ASSIGNOR, BY MESNE ASSIGNMENTS, TO GREAT NORTHERN FUR DYEING AND DRESSING CORPORATION, OF SPRINGFIELD GARDENS, NEW YORK, A CORPORATION OF NEW YORK.

FUR-SHEARING MACHINE.

Application filed June 5, 1925. Serial No. 35,193.

*To all whom it may concern:*

Be it known that I, MALCOLM DICKERSON, a citizen of the United States of America, and resident of Newark, in the county of Essex and State of New Jersey, have invented a new and Improved Fur-Shearing Machine, of which the following is a full, clear, and exact description.

This invention relates to shearing machines and has particular reference to an improvement in fur shearing machines which are especially designed for clipping to a uniform length the fur of fur bearing pelts or hides.

Fur shearing machines now in general use embody a rotary shearing knife mounted in a casing or hood which defines an elongated opening or slot through which an endless movable carrier or belt projects for disposing the fur side of the pelts or skins to the action of the shearing knife; a suction draft creating means being provided and having communication with the casing, first for the purpose of raising or causing the fur to stand out on the skin or pelt as it is presented to the shearing knife whereby to effect the shearing or clipping of the fur to a uniform length, and second for the purpose of removing and conveying off the clipped ends of the fur. At the present time, it is the general practice to temporarily sew together in end to end relation a large number or line of pelts, pin or otherwise fasten the leading pelt to the endless carrier or pelt until the line of pelts are properly started through the machine, then to stop the machine, unfasten the leading pelt and finally continue the operation of the machine in the feeding of the line of pelts therein through. Obviously this practice entails a considerable amount of time and labor both in the operation of the sewing of the pelts together and the separation of the same, in addition to the time required by the necessity of stopping the machine to unfasten the leading pelt which is attached to the conveyor or carrier.

In my copending application, Serial No. 30,063 a feeding and guiding means cooperating with the endless movable carrier or belt has been provided for effecting the proper feeding of the skins or pelts separately through the machine, thereby eliminating the temporary attachment of the skins to each other and the necessity of stopping and starting the machine to attach the leading pelt of a line to or detach the same from the carrier. In this instance the guiding means consisting of a plurality of endless flexible elements such as cords or cables have been found to obstruct portions of the fur and prevent the clipping of the obstructed portions so that a second running of each pelt through the machine is necessitated to insure the shearing of the obstructed portions of the fur.

In order to overcome this objection and disadvantage and consequently the amount of time and labor involved in the second running of the pelts, the present invention comprehends as its main object the provision of a machine which is provided with an auxiliary or secondary shearing knife to which the fur side of the pelts is subsequently presented and in which the guiding and feeding means is trained in such a manner as to engage with the pelts at a different point when presented to the secondary or auxiliary shearing knife from the point with which it engages the pelts when presented to the first or initial shearing knife, whereby a single running of the pelts through the machine will accomplish a complete and uniform shearing operation.

In machines of this character it is essential periodically to gain access to the cutting edges of the shearing knives for the purpose of sharpening or steeling the blades and it is therefore a further object of the present invention to provide a supporting means or mounting for the pelt conveying, feeding and guiding means which admits of ready movement of the same to an out-of-the-way position whereby access is facilitated to the shearing knives for the purpose specified.

As a further object the invention comprehends means for effecting adjustments of the guide elements for the pelt conveying, feeding and guiding means at the points of presentation of the fur side of the pelts to the shearing knives whereby to adjust or regulate the length at which the fur is to be sheared.

The invention furthermore contemplates means for adjusting the stationary shearing blade of each shearing unit whereby to insure a proper shearing action.

Other objects of the invention reside in the comparative simplicity of the construction of the machine and its mode of operation and the feature of the high degree of efficiency with which the same accomplishes its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Fig. 3 is a vertical sectional view through the machine taken approximately on the line indicated at 3—3 in Fig. 2.

Fig. 4 is a fragmentary vertical sectional view illustrating the pelt conveying, guiding and feeding mechanism moved to an unobstructing or out-of-the-way position for the purpose of gaining access to the shearing units for effecting repairs to or sharpening the shearing blades.

Fig. 5 is a fragmentary detail sectional view of the adjusting means for the stationary shearing blades.

Fig. 6 is a fragmentary side view illustrating the means for adjusting the guide element which controls the regulation of the length of the shearing of the fur.

Fig. 7 is a fragmentary sectional view thereof taken approximately on the line 7—7 of Fig. 6.

Figure 1:
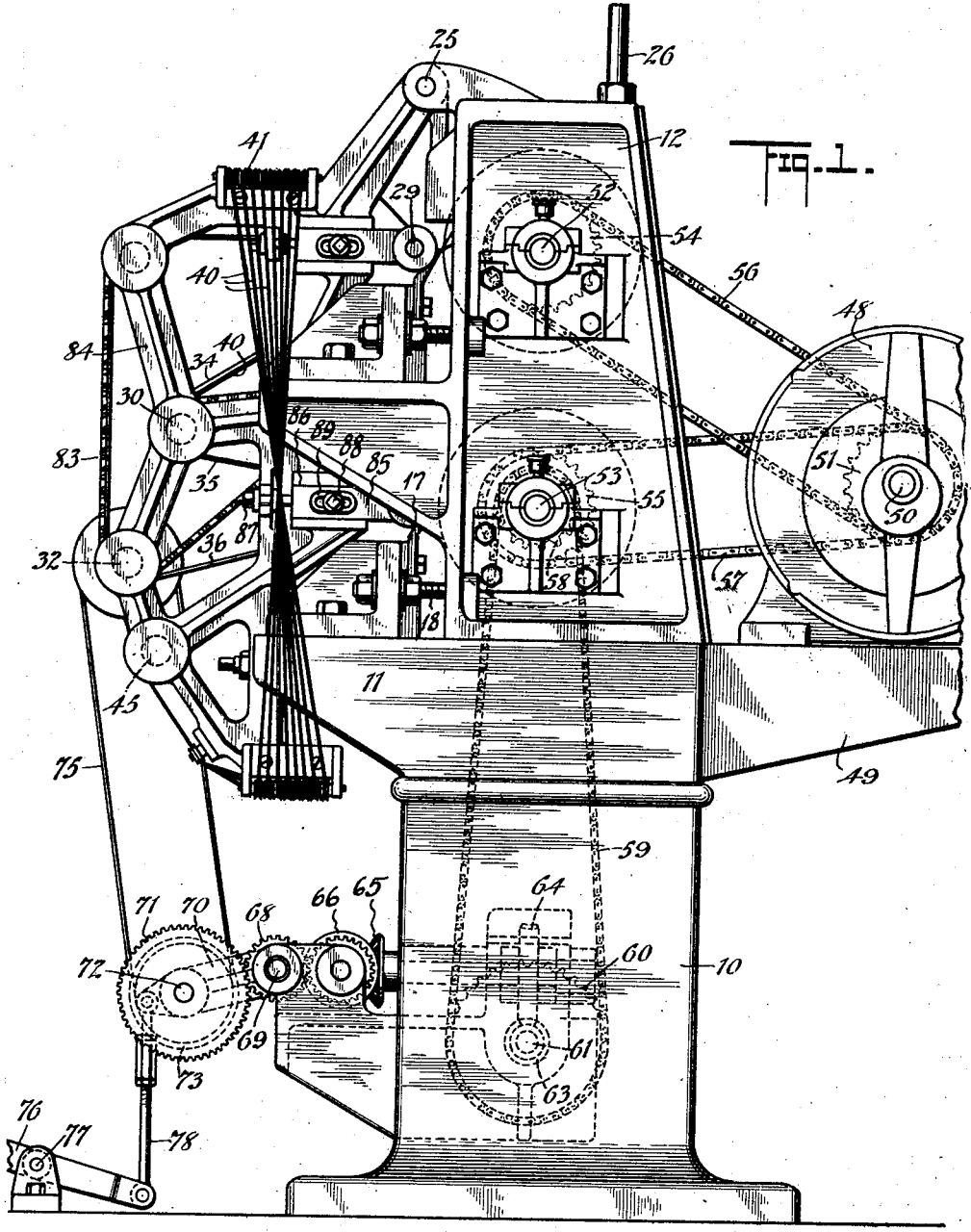
Figure 1 is a side view of a fur shearing machine constructed in accordance with the invention.
Figure 2:
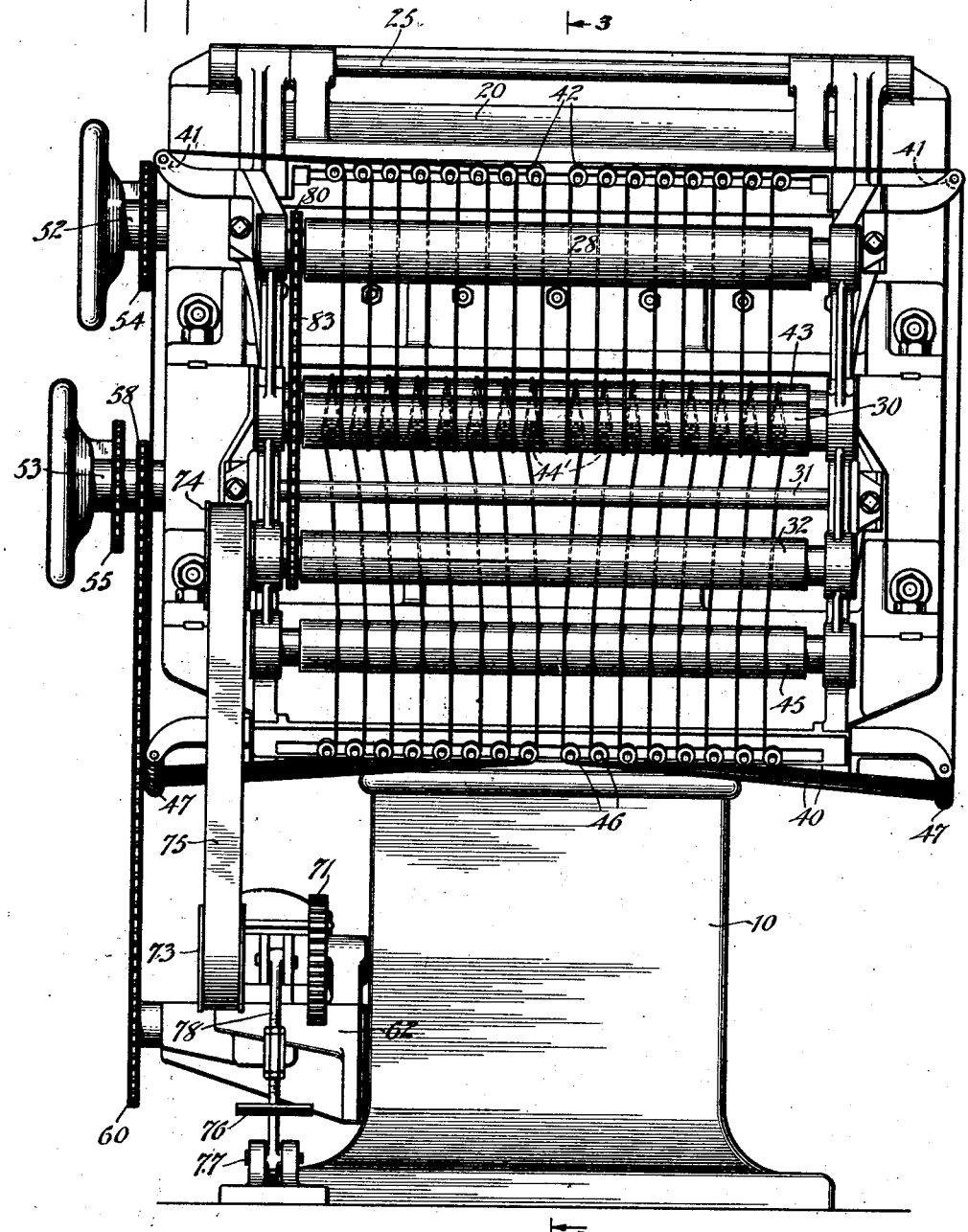
Fig. 2 is a front view of the machine with the pelt conveying means removed to more clearly disclose the guiding and feeding means.

Referring to the drawings by characters of reference 10 designates a base upon which a table 11 is mounted and which table in turn supports therefrom a housing 12 within which a pair of superposed rotary shearing elements 13 and 14 are mounted for rotation. Each shearing element includes a number of annularly arranged blades 15 having cutting edges 16 which are designed to coact with a stationary knife blade 17 supported by the machine for adjustments toward and away from the blades 15 of the rotary shearing elements 13 in any suitable manner but as specifically illustrated in Fig. 5 by adjusting screws 18 which threadedly engage in the threaded bores 19 of a part of the frame of the machine. The housing 12 is completely closed at its rear, sides, top and bottom while its front is partially closed by the stationary knife blade structures 17 and superposed pivoted hoods 20 and 21 which respectively define between the upper and lower stationary knife blades, elongated slots or openings 22 and 23. A supporting framework 24 is pivoted as at 25 to the housing 12 for swinging movement from its normal lowered or down position illustrated in Figs. 1, 2 and 3 to an unobstructing or raised position as illustrated in Fig. 4 where it engages with and rests upon supporting studs 26 projecting upwardly from the rear portion of the housing. The said framework 24 constitutes means for completely and independently supporting the pelt conveying and pelt guiding and feeding means, which means together with the framework are movable to the unobstructing out-of-the-way position when repairs to the shearing units or sharpening of the blades are to be effected.

The pelt conveying means consists of an endless conveyor element 27 such as a single belt the width of the machine or a plurality of parallel cords, cables or the like or other similar equivalents, which endless conveyor is trained over a transverse upper forward roller 28, a transverse upper rear roller 29, a transverse intermediate roller 30 thence around a transverse lower rear roller 31 and a lower forward roller 32 presenting an upper substantially horizontal lead 33 extending between the rollers 28 and 29; a forwardly and downwardly inclined lead 34 extending between the upper rear roller 29 and the intermediate roller 30; a downwardly and rearwardly inclined lead 35 extending from the intermediate roller 30 to the lower rear roller 31; a downwardly and forwardly inclined lead 36 extending from the lower rear roller 31 to the lower forward roller 32; and a vertical lead 37 extending from the lower forward roller 32 to the upper forward roller 28. The rear upper roller 29 and rear lower roller 31 extend partially into the elongated slots or openings 22 and 23 respectively so that the bights 38 and 39 are formed adjacent to the point of engagement of the cutting edges 16 of the rotary blades 15 with the stationary blades 17. A plurality of endless flexible guiding and feeding elements 40 are provided, portions of which number are trained respectively around and from upper side guide sheaves 41 at opposite sides of the framework 24 to the upper transversely spaced angularly disposed upper guide sheaves 42 from whence the same are trained downwardly and rearwardly around the upper bight 38 of the conveyor 27 thence following over the lead 34 of the conveyor around the intermediate roller 30 and between said roller and the conveyor. At this point the elements 40 are trained upwardly and rearwardly away from the lead 35 over a transverse intermediate guide roller 43. From the guide roller 43 the elements 40 are trained around the intermediate angularly disposed guide sheaves 44 which are transversely spaced in staggered relation to the upper angularly disposed guide sheaves 42. The portions of the elements 40 which are trained around the bight 39 of the conveyor element 27 coming again into contact with the pelts or hides, engage the same at points between the points of previous engagement therewith whereby the portions or tufts of fur which were held down and prevented from being subjected to the shearing action of the upper shearing unit are unobstructed and acted upon by the suction draft to raise the same for subjection to the shearing action of the lower shearing unit 14. From the bight 39 of the conveyor element 27 the feeding and guiding elements 40 are trained around a lower guide roller 45 which is spaced below the lower forward guide roller 32 for the conveyor element thereby causing the leads of the feeding and guiding elements between the bight 39 and roller 45 to diverge forwardly and downwardly with respect to the downwardly and forwardly inclined lead 36 of the conveyor. From the lower guide roller 45, the elements 40 are trained around the lower angularly disposed guide sheaves 46 at which point a proportion or approximately half of the elements 40 are respectively trained to the lowermost side guide sheaves 47 and thence upwardly to the uppermost side guide sheaves 41.

The driving mechanism for the machine consists of any prime mover such as a motor 48 which is mounted on a shelf 49 projecting rearwardly from the table 11, the motor shaft 50 having keyed thereto sprockets 51. The upper and lower shearing units are mounted on shafts 52 and 53 each of which has a laterally projecting portion from the housing upon which the sprockets 54 and 55 are keyed. Sprocket chains 56 and 57 are respectively trained around the sprockets 51, 54 and 55 for driving the shearing units in unison. The projecting extremity of the lower shearing unit shaft 53 has also keyed thereto a sprocket 58 and a sprocket chain 59 is trained around and leads downwardly therefrom to a lower sprocket 60 on a shaft 61 keyed by a bracket 62 on the base 10 of the machine. A reducing worm gear and worm 63 and 64 effect the driving of a bevel gear 65 at a reduced speed relative to the speed of the shearing units. The bevel gear 65 meshes with and drives a bevel pinion 66 which in turn drives the spur gears 67 and 68 the latter mounted on a shaft 69 in the bearing bracket. A bearing yoke 70 is pivoted concentric to the shaft 69 and has mounted therein a spur gear 71. Mounted on and secured to the shaft 72 of the spur gear 71 is a belt pulley 73. A belt pulley 74 is secured to the roller 32 in superposed relation to the belt pulley 73 and a drive belt 75 is trained around said pulleys for driving the pulley 74 by the pulley 73. The weight of the spur gear 71, the belt pulley 73 and the bearing yoke 70 normally effects a taut condition of the belt 75 for effecting the driving of the pulley 74 from the pulley 73. In order however to provide means for producing a slack in the belt 75 to render the drive between the belt pulleys inoperative, a foot pedal 76 is fulcrumed as at 77 and is connected by a connecting rod 78 with the yoke 70 for raising the yoke, spur gear 71 and belt pulley 73. The driven lower forward roller 32 is operatively connected with the upper forward roller 28, the intermediate roller 30 and the intermediate guide roller 43 whereby these rollers are driven in unison to effect a positive driving of both the conveyor means 27 and the guiding and feeding elements 40. This is accomplished by providing on the roller 32 a sprocket 79, on the roller 28 a sprocket 80, on the roller 30 a sprocket 81 and on the roller 43 a sprocket 82 around all of which sprockets a sprocket chain 83 is trained.

In use and operation of the machine the pelts, fur side up, are laid upon the upper horizontal lead 33 of the endless conveyor element 27 which is driven and moves from the upper forward roller 28 rearwardly toward the upper rear roller 29 in the direction indicated by the arrow in Fig. 3. It is of course understood that the width of the conveyor element and the pelts to be sheared controls the number of pelts which may be fed to the machine in side by side relation. As the pelts reach the rear upper roller 29 the guiding and feeding elements 40 contact and engage with the fur side to hold the skin of the pelt against the bight 38 in the conveyor while the suction draft acts to raise or cause the fur to stand out for subjection to the action of the rotating and stationary shearing knives 15 and 17. The elements 40 continue to hold and maintain the pelts against the under side of the forwardly and downwardly inclined lead 34 of the conveyor until the same have passed around and under the intermediate roller 30, at which point the feeding and guiding elements 40 diverge upwardly and rearwardly from the downwardly and rearwardly inclined lead 35 of the conveyor. The pelts which have initially been subjected to the action of the upper shearing unit are thence conveyed rearwardly and downwardly toward the rear lower roller 31. In the meantime the feeding and guiding elements which are trained upwardly over the intermediate guide roller 43 are guided laterally by the intermediate angularly disposed guide sheaves 44 so that their re-engagement with the pelts carried by the lead 35 will occur at different points from their initial points of engagement.

This allows the fur which previously was obstructed by the elements during the initial shearing operation to be free for subjection to the action of the suction draft whereby the unsheared ends will be acted upon by the lower shearing unit 14, as the pelts pass around the bight 39 and are held down by the elements 40. From this point the pelts move forwardly and downwardly away from the underside of the lead 36 and are conveyed and discharged at the front of the machine by means of the elements 40 which in effect constitute a discharging conveying means. Under this arrangement it is obvious that a single running of the pelts through the machine will effect a complete and uniform shearing of the fur thereby obviating the necessity of a re-running of the pelts. The starting and stopping of the conveyor 27 and the feeding and guiding elements 40 is readily controlled by the operator by means of the foot pedal 76 while the starting and stopping of the shearing units is independently controlled.

In order to increase or decrease the length at which the fur is to be cut, the rollers 29 and 31 are mounted for adjustment on bracket arms 85 slidable forwardly and rearwardly in the guide grooves 86 of the framework 24, an adjusting screw 87 being provided for moving the bracket arms and a retaining screw 88 passing through a slot 89 in the bracket for holding the brackets in their adjusted positions. When it is desired to gain access to the rotary shearing elements for the purpose of effecting repairs or sharpening the cutting edges of the shearing knives, the framework the cutting edges of the shearing knives, the framework 24 with the complete conveying means and guiding and feeding elements, is swingable to a raised out-of-the-way position as illustrated in Fig. 4 where the same rests upon and is supported by the supporting studs 26.

I claim:

1. A fur shearing machine for fur bearing pelts comprising a plurality of shearing units, a conveying means for successively carrying and presenting the pelts to and conveying the same from each shearing unit and elements movable with and cooperating with the hides for maintaining the same in contact with the conveyor when in the presence of the shearing units, said elements engaging with different portions of each pelt at the points of presentation to the respective shearing units.

2. In a fur shearing machine for fur bearing pelts, a plurality of shearing units, a conveying means for successively carrying and presenting the pelts to and conveying the pelts from each shearing unit and means movable with and by the conveyor means for cooperation therewith at laterally spaced points to maintain the pelts in contact with the conveyor when in the presence of the shearing units.

3. A fur shearing machine for fur bearing pelts comprising a pair of shearing units, conveying means for successively carrying and presenting the fur side of the pelts to the shearing units and guiding and feeding means cooperating with the conveying means to maintain the pelts thereagainst during the presentation of the same to the shearing units, said guiding and feeding means cooperating with the conveying means respectively at relative staggered points during the presentation of the pelts to the different shearing units.

4. In a fur shearing machine for fur bearing pelts a pair of shearing units, conveyor means successively presenting the pelts to the shearing units, and means overlying and cooperating with the skins of the pelts for maintaining the same in contact with the conveying means when at each point of presentation, said means positioned in staggered relation to engage different portions of each pelt when presented to the respective shearing units whereby the obstructed portions of the fur presented to the first shearing unit will be unobstructed when presented to the second shearing unit in order to effect a complete shearing of the fur upon a single running of the pelts through the machine.

5. In a fur shearing machine means for initially shearing a portion of the fur and means for subsequently shearing the remainder of the fur, comprising a pair of shearing units, conveying means for successively carrying and presenting the pelts to and conveying the same from each shearing unit, means overlying the pelts at the point of presentation to the shearing units, said latter means being disposed in staggered relation with respect to each other at the different points of presentation of the pelts to the respective shearing units.

6. In fur bearing pelt finishing machines which include devices for successively operating upon the same and conveyors for conveying the pelts through the machine into the presence of said devices, means cooperating with the conveyors for holding the pelts thereagainst when in the presence of said devices, said latter means engaging with different portions of each pelt at the points of presentation to the respective operating devices.

7. In fur bearing pelt finishing machines which include devices for successively operating upon the same and conveyors for conveying the pelts through the machine into the presence of said devices, means cooperating with the conveyors for holding the pelts thereagainst when in the presence of said devices, said latter means engaging with different portions of each pelt at the points of presentation to the respective operating devices, said latter means consisting of endless flexible elements and guides for said elements for effecting the engagement of the same at the points of presentation to the operating devices in staggered relation whereby the portions of the fur initially obstructed by the endless flexible elements when presented to the first operating device will be unobstructed when presented to the second operating device as and for the purpose specified.

8. The combination with a machine for operating upon fur bearing pelts, which machine includes a moving carrier for conveying the pelts through the machine successively into the presence of a plurality of devices for operating thereupon, of a feeding and guiding means movable with and by the carrier for engaging and holding the pelts in contact therewith during the operation of the devices thereupon, said means consisting of endless flexible elements and guide means over which the elements are trained, said guide means functioning to cause the feeding and guiding means to contact with the pelts respectively at different points during the operation of the successive devices thereupon.

9. In a shearing machine for fur bearing pelts which includes a pair of shearing units, a conveyor for carrying and presenting pelts to and conveying the same from the shearing mechanism and feeding and guiding means comprising endless laterally spaced flexible elements movable with the conveyor and cooperating therewith for maintaining the hides in contact with the conveyor when at the point of presentation to the shearing units, and guide means for the endless flexible elements for guiding the same away from the conveying means between the shearing units and for effecting the re-engagement of the same with the second shearing unit at transversely staggered points relative to the engagement with the same at the points of presentation to the first shearing unit.

10. In a shearing machine for fur bearing pelts which includes a pair of shearing units, a conveyor for carrying and presenting pelts to and conveying the same from the shearing mechanism and feeding and guiding means comprising endless laterally spaced flexible elements movable with the conveyor and cooperating therewith for maintaining the hides in contact with the conveyor when at the point of presentation to the shearing units, and guide means for the endless flexible elements for guiding the same away from the conveying means between the shearing units and for effecting the re-engagement of the same with the second shearing unit at transversely staggered points relative to the engagement with the same at the points of presentation to the first shearing unit, and supporting, guiding and driving means for the conveyor and for the feeding and guiding means pivotally attached to the machine for swinging movement to an out-of-the-way position.

11. A shearing machine for fur bearing pelts including a pair of shearing units including rotary knives and stationary knives, a housing for the rotary knives, a conveyor extending through said opening for successively carrying and presenting the pelts to and conveying the same from each shearing unit, means cooperating with the conveyor and the pelts to maintain the hides in contact with the conveyor when in the presence of the shearing units, said means consisting of a series of endless cords and guide sheaves therefor for disposing portions of the cord in juxtaposition to the conveyor adjacent to the shearing units, the said guides leading the cords away from the conveyor between the shearing units and returning the same to the conveyor adjacent the second unit at laterally staggered points with relation to the points of first engagement whereby the obstructed portions of the fur when the pelts are subjected to the action of the first shearing unit will be unobstructed when subjected to the action of the second unit.

12. In fur bearing pelt finishing machines which include a plurality of devices successively operating upon the pelts and conveying means for carrying the pelts through the machine successively into the presence of said devices for operation upon thereby, means cooperating with the conveying means and engaging distinct portions of the pelts at the points of presentation to the respective operating devices.

13. In fur bearing pelt finishing machines which include a plurality of devices successively operating upon the pelts and conveying means for carrying the pelts through the machine successively into the presence of said devices for operation upon thereby, means movable with and cooperating with the conveying means and engaging distinct portions of the pelts at the points of presentation to the respective operating devices.

14. In fur bearing pelt finishing machines which include a plurality of devices successively operating upon the pelts and conveying means for carrying the pelts through the machine successively into the presence of said devices for operation upon thereby, means movable with and cooperating with the conveying means and engaging distinct portions of the pelts at the points of presentation to the respective operating devices, said means comprising a plurality of endless flexible elements.

15. In fur bearing pelt finishing machines which include a plurality of devices successively operating upon the pelts and conveying means for carrying the pelts through the machine successively into the presence of said devices for operation upon thereby, means movable with and cooperating with the conveying means and engaging different portions of the pelts at the points of presentation to the respective operating devices, said means comprising a plurality of endless flexible elements and means for driving said elements with the conveyor.

16. In fur bearing pelt finishing machines which include a plurality of devices successively operating upon the pelts and conveying means for carrying the pelts through the machine successively into the presence of said devices for operation upon thereby, means movable with and cooperating with the conveying means and engaging different portions of the pelts at the points of presentation to the respective operating devices, said means comprising a single set of endless flexible elements and guide means for the same for guiding the cords into cooperating engagement with the distinct portions of the pelts at the respective points of presentation to the several operating devices.

17. A machine for shearing the fur of fur bearing pelts comprising a plurality of shearing devices for successively operating upon the pelt fur, endless movable conveying means for carrying the pelts through the machine and presenting the same successively to the devices for operation upon thereby and means movable with and cooperating with the conveying means and engaging different portions of the pelts at the points of subjection of the same to the respective operating devices for holding the pelts in contact with the conveyor whereby the portions obstructed by said means when presented to one of the shearing devices are unobstructed when presented to others of the shearing devices.

18. A shearing machine for cutting the fur of fur bearing pelts to a uniform length including a pair of shearing devices for successively operating upon the fur of the pelt, conveying means for carrying the pelts through the machine and presenting the same successively to said devices for operation upon thereby, a set of endless flexible elements, means for driving the same with the conveying means and guide means for said elements adapted to guide the same into cooperating engagement with different portions of the pelts at the respective points of presentation to the several shearing devices whereby the obstructed portions of the fur at the point of presentation to the first shearing device by said means is unobstructed thereby when presented to the second shearing device.

MALCOLM DICKERSON.